(12) United States Patent
Rarick (10) Patent No.: US 7,185,043 B2
(45) Date of Patent: Feb. 27, 2007

(54) ADDER INCLUDING GENERATE AND PROPAGATE BITS CORRESPONDING TO MULTIPLE COLUMNS

(75) Inventor: Leonard D. Rarick, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 606 days.

(21) Appl. No.: 10/601,376

(22) Filed: Jun. 23, 2003

(65) Prior Publication Data

US 2004/0267862 A1 Dec. 30, 2004

(51) Int. Cl.
*G06F 7/50* (2006.01)

(52) U.S. Cl. ...................................... 708/710
(58) Field of Classification Search .............. 708/710
See application file for complete search history.

(56) References Cited

U.S. PATENT DOCUMENTS

| | | | | |
|---|---|---|---|---|
| 3,925,652 A | * | 12/1975 | Miller | 708/711 |
| 4,858,168 A | * | 8/1989 | Hwang | 708/713 |
| 5,117,386 A | * | 5/1992 | Persoon et al. | 708/711 |
| 5,122,982 A | | 6/1992 | Cohn | |
| 5,278,783 A | * | 1/1994 | Edmondson | 708/711 |
| 5,497,343 A | | 3/1996 | Rarick | |
| 5,504,915 A | | 4/1996 | Rarick | |
| 5,875,125 A | * | 2/1999 | Hwang et al. | 708/710 |
| 5,944,777 A | * | 8/1999 | Kumar et al. | 708/713 |
| 6,219,687 B1 | | 4/2001 | Petro et al. | |
| 6,223,199 B1 | | 4/2001 | Petro et al. | |
| 6,269,387 B1 | | 7/2001 | Petro et al. | |
| 2004/0073593 A1 | * | 4/2004 | Wen | 708/710 |

OTHER PUBLICATIONS

M. Morris Mano: Computer System Architecture; Prentice-Hall 1976, pp. 243-249.

* cited by examiner

*Primary Examiner*—Tan V. Mai
(74) *Attorney, Agent, or Firm*—Meyertons Hood Kivlin Kowert & Goetzel, P.C.; B. Noël Kivlin; Stephen J. Curran (57) ABSTRACT

An apparatus for adding a first value and a second value each including a plurality of bits includes combiner units, a carry creation unit and summation units. Bits corresponding to bit positions of the first and the second value form respective columns. Each of the combiner units may provide a generate and propagate bit pair in response to receiving respective bits of the first and the second value which correspond to a plurality of the respective columns. The carry creation unit may create an ordered plurality of carry bits each corresponding to one or more of the generate and propagate bit pairs. Each of the summation units may generate a plurality of sum bits in response to receiving the respective bits of the first and the second value which correspond to the plurality of respective columns.

18 Claims, 8 Drawing Sheets

ADDER INCLUDING GENERATE AND PROPAGATE BITS CORRESPONDING TO MULTIPLE COLUMNS

BACKGROUND OF THE INVENTION

1. Field of the Invention

This invention relates to arithmetic implementations and, more particularly, to adder circuits and methods.

2. Description of the Related Art

Computing devices typically employ one or more types of processing machines. For example, a computer may include a variety of processing machines such as central processing unit (CPU), which is often referred to as a microprocessor or just processor. In addition, a computer may include a graphics engine for generating digital images for display. Other types of processing machines include digital signal processors (DSP) and specialized cryptographic processing engines, for example.

Each of the processing machines discussed above may include one or more arithmetic circuits for performing addition. These types of arithmetic circuits are commonly referred to as adders. One common addition method is a carry look-ahead method. The circuit implementation of that method is referred to as a carry look-ahead adder. As shown below, two six-bit binary numbers, including a carry-in bit, are added to form a seven-bit sum.

$$
\begin{array}{rcccccc}
 & & & & & & C_0 \\
 & A_5 & A_4 & A_3 & A_2 & A_1 & A_0 \\
+ & B_5 & B_4 & B_3 & B_2 & B_1 & B_0 \\
\hline
S_6 & S_5 & S_4 & S_3 & S_2 & S_1 & S_0
\end{array}
$$

Figure 1:
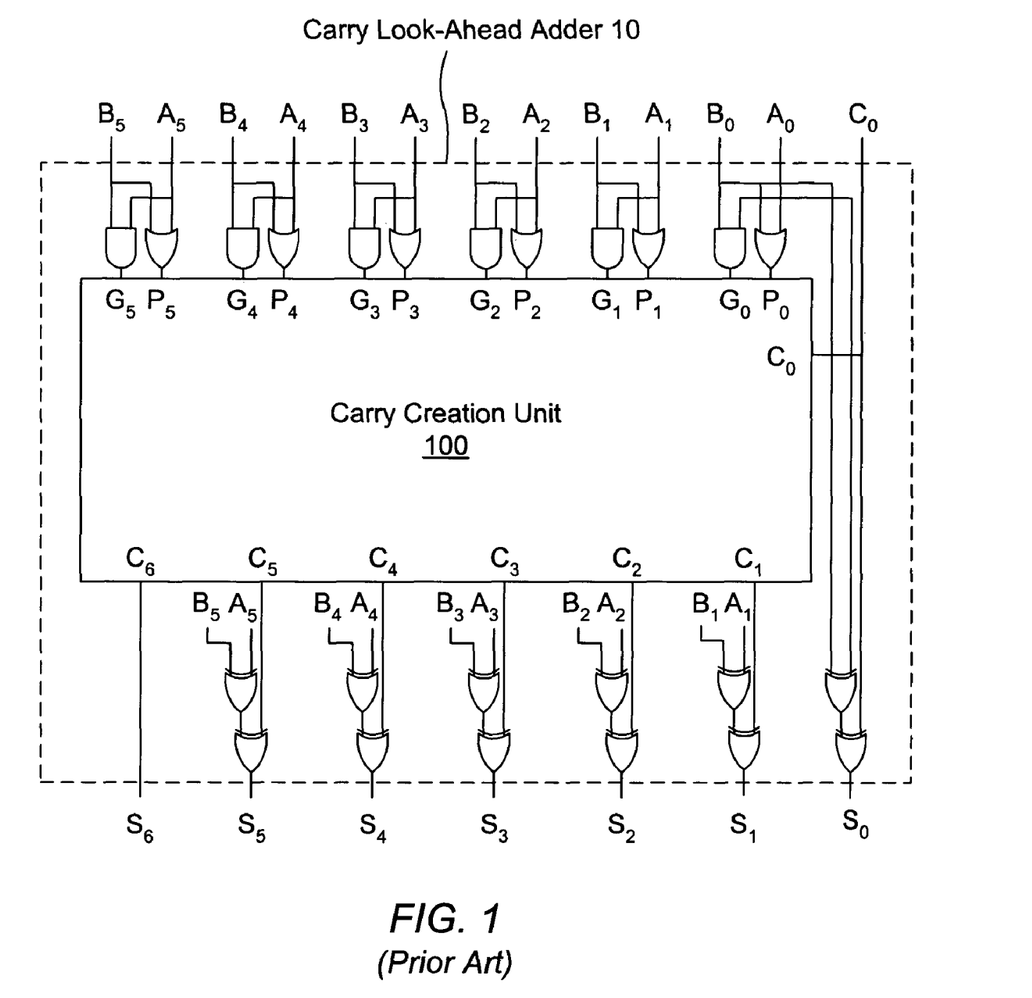
FIG. 1 is a block diagram of one embodiment of a prior art adder circuit.

Using a carry look-ahead adder 10, a generate bit (e.g, $G_0$) and a propagate bit ($P_0$) are created for each column (bit position) of the binary numbers to be added. Thus, the generate and propagate bit pairs are referred to herein as having a given oredered position. For example, $G_0P_0$ may occupy the least significant position whle $G_5P_5$ may occupy the most significant position. The generate bit and propagate bit pairs may be combined in a variety of ways, depending on the specific logic implementation, by a carry creation unit 100 to create and output a carry-in bit that corresponds to each column. Similar to the generate and propagate bit pairs, the carry-in bits output by carry creation unit 100 (e.g., $C_1$–$C_6$) are also referred to herein as having a given ordered position. For example, $C_1$ may occupy the least significant position while $C_6$ may occupy the most significant position.

Generally speaking, a given carry-in bit (e.g., $C_1$–$C_6$) may be created based on all generate and propagate bit pairs occupying less significant ordered positions. For example, carry-in bit $C_1$ may be created based upon the $G_0P_0$ bit pair and the $C_0$ carry-in bit, which functions as a generate bit for the –1 position. Likewise, the $C_4$ carry-in bit may be created based upon the $G_3P_3$ bit pair as well as the $G_2P_2$, $G_1P_1$ and $G_0P_0$ bit pairs and the $C_0$ carry-in bit. The carry creation general equation may be written as:

$$C_{i+1} = G_i + P_i C_i$$

where $G_i = A_i B_i$ and $P_i = A_i + B_i$.

To further illustrate the dependency of a carry bit upon the generate and propagation bits having less significant ordered positions, the carry-in bit C4 may be written generally as:

$$C_4 = G_3 + P_3 G_2 + P_3 P_2 G_1 + P_3 P_2 P_1 G_0 + P_3 P_2 P_1 P_0 C_0$$

To start the creation of the sum bits $S_0$–$S_6$, while the generate and propagate signals are working through carry creation unit 100, an XOR operation is performed on the two input bits (e.g., $A_i$ and $B_i$) for each column. When the respective carry-in bits are output from carry creation unit 100, another XOR operation is performed on the result of the input bit XOR operation and the carry-in bit ($C_i$) for that column, which results in a sum bit ($S_i$) for that column. Thus, the summation general equation may be written as:

$$S_i = (A_i \oplus B_i) \oplus C_i.$$

In the example described above, two six-bit numbers were added. To increase the number of bits in each binary number to be added, it is possible to increase both the number of inputs and the number of outputs of carry creation unit 100. However, to do so will increase the number of logic gates within carry creation unit 100. Since increasing the number of gates may increase the area consumed on an integrated circuit chip, the cost of increasing the number of gates may become prohibitive. In addition, to add two 12-bit numbers, which is a linear increase in bits, the number of gates in the carry creation unit may incur a greater than linear increase (e.g., n log n). Also, by increasing the size of carry creation unit 100, the wire lengths may also increase, possibly causing additional unwanted delays. Further, the increase in the number of gates may also increase the number of gates in the longest path in carry creation unit 100, possibly resulting in further delays.

SUMMARY OF THE INVENTION

Various embodiments of an apparatus and method for adding a first value and a second value each including a plurality of bits are disclosed. Bits corresponding to bit positions of the first value and the second value form respective columns. In one embodiment, the apparatus includes a plurality of combiner units. Each combiner unit may provide a generate and propagate bit pair in response to receiving respective bits of the first value and the second value which correspond to a plurality of the respective columns. The apparatus also includes a carry creation unit that may create an ordered plurality of carry bits each corresponding to one or more of the generate and propagate bit pairs. The apparatus further includes a plurality of summation units. Each summation unit may generate a plurality of sum bits in response to receiving the respective bits of the first value and the second value which correspond to the plurality of respective columns. A subset of the summation units may generate a portion of the sum bits in response to receiving respective ones of the ordered plurality of carry bits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
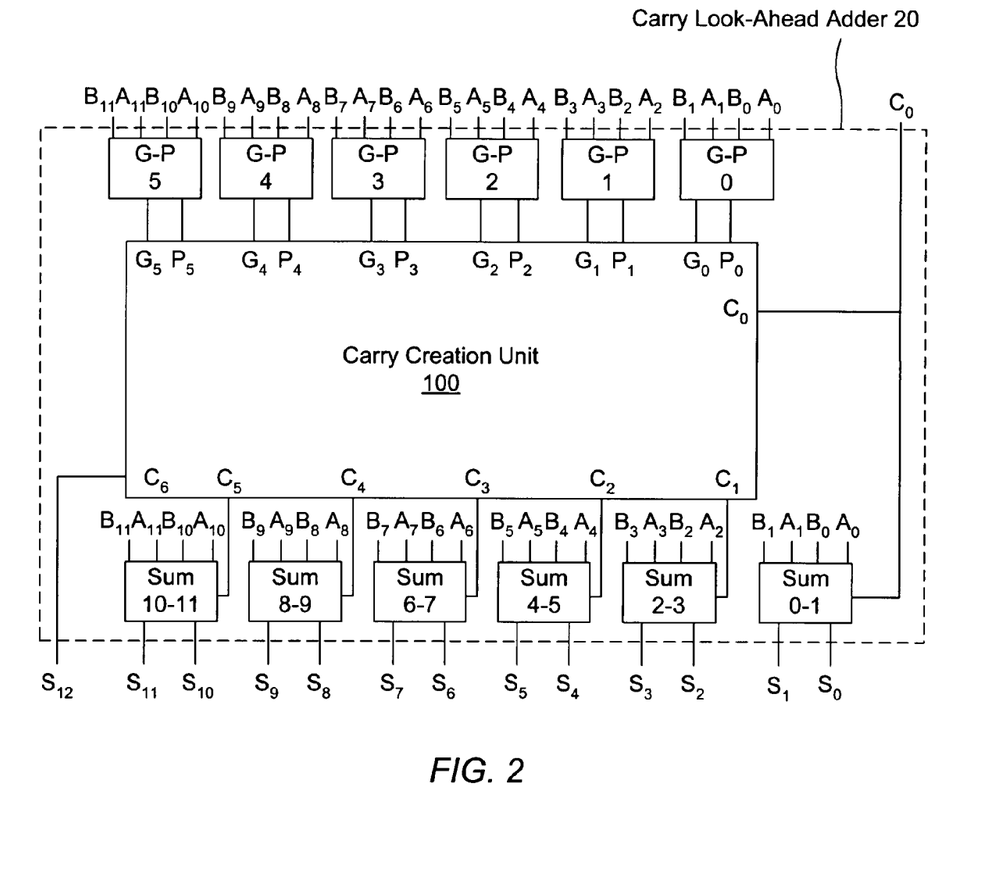
FIG. 2 is a block diagram of one embodiment of a carry look-ahead adder that combines two columns.

Turning now to FIG. 2, a block diagram of one embodiment of a carry look-ahead adder that combines two columns to form a generate and propagate bit pair is shown. Components corresponding to those illustrated in FIG. 1 are numbered identically for clarity and simplicity. An exemplary addition of two 12-bit values (A and B) and a carry-in bit ($C_0$) are added to form a 13-bit value.

|   |   | $A_{11}$ | $A_{10}$ | $A_9$ | $A_8$ | $A_7$ | $A_6$ | $A_5$ | $A_4$ | $A_3$ | $A_2$ | $A_1$ | $C_0$ $A_0$ |
|---|---|---|---|---|---|---|---|---|---|---|---|---|---|
| + |   | $B_{11}$ | $B_{10}$ | $B_9$ | $B_8$ | $B_7$ | $B_6$ | $B_5$ | $B_4$ | $B_3$ | $B_2$ | $B_1$ | $B_0$ |
|   | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ | $S_0$ |

As described above, each bit of the two values occupies a bit position and each bit position corresponds to a respective column.

In the illustrated embodiment, carry look-ahead adder 20 includes a carry creation unit 100 coupled to a plurality of combiner units that are designated G-P0 through G-P5. Carry look-ahead adder 20 is also coupled to a plurality of summation units that are designated Sum0–1 through Sum 10–11. Combiner units G-P0 through G-P5 are coupled to receive the bits (e.g., $A_0$–$A_{11}$ and $B_0$–$B_{11}$) of the two values to be added. As illustrated, G-P0 receives the values in columns 0 and 1 (e.g., $A_0$–$A_1$ and $B_0$–$B_1$), G-P1 receives the values in columns 2 and 3 (e.g., $A_2$–$A_3$ and $B_2$–$B_3$), and so forth. In addition, summation units Sum0–1 through Sum 10–11 receive the bits of the two values to be added and also a carry-in bit. For example, Sum0–1 receives the values in columns 0 and 1 (e.g., $A_0$–$A_1$ and $B_0$–$B_1$) and also the carry-in bit value $C_0$. Sum2–3 receives the values in columns 2 and 3 (e.g., $A_2$–$A_3$ and $B_2$–$B_3$) and also the carry-in bit value $C_1$, which is generated by carry creation unit 100. Likewise, the remaining summation units receive the values in the remaining columns in a similar way.

As described above in conjunction with the description of FIG. 1, carry creation unit 100 may be configured to generate a given carry-in bit based upon all generate and propagate bit pairs occupying less significant ordered positions. Accordingly, in FIG. 2, carry-in bit $C_4$ may be created based upon the $G_3P_3$ bit pair as well as the $G_2P_2$, $G_1P_1$ and $G_0P_0$ bit pairs and the $C_0$ carry-in bit. However as will be described in greater detail below in conjunction with the description of FIG. 3A and FIG. 3B, in contrast to the embodiment shown in FIG. 1, the combiner units illustrated in FIG. 2 may create each of the generate and propagate bit pairs based upon two columns of input values. Likewise, in contrast to the embodiment shown in FIG. 1, the summation units illustrated in FIG. 2 may create the sum bits based upon two columns of input values. Thus, the combining of more than one column of bits per generate and propagate bit pair may allow for addition of values having a greater number of bits while using the same carry creation unit. For example, the same carry creation unit 100 is used in both FIG. 1 and FIG. 2. However, using the adder circuit shown in FIG. 1, two 6-bit values are added, while in FIG. 2, two 12-bit values are added. Looked at from an alternative viewpoint, if two fixed size values are to be added, a smaller carry creation unit may be used using the embodiment of the adder shown in FIG. 2 than may be used in the embodiment shown in FIG. 1.

Figure 3A:
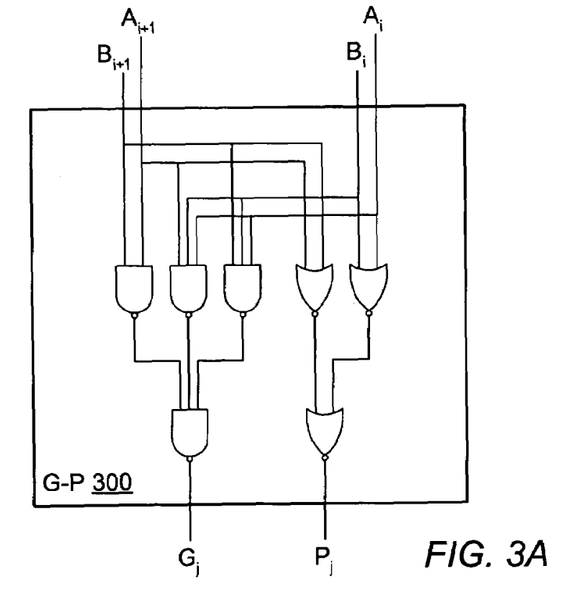
FIG. 3A is a diagram of one embodiment of a generate and propagate bit circuit of FIG. 2.

Referring to FIG. 3A, a diagram of one embodiment of a generate and propagate bit circuit of FIG. 2 is shown. A general Boolean equation for creating a generate bit $G_j$ from two columns of bits may be written as:

$$Gj = (A_{i+1} \cdot B_{i+1}) + (A_{i+1} \cdot A_i \cdot B_i) + (B_{i+1} \cdot A_i \cdot B_i).$$

Further, a general Boolean equation for creating a propagate bit $P_j$ from two columns of bits may be written as:

$$Pj = (A_{i+1} + B_{i+1}) \cdot (A_i + B_i).$$

It is noted that the general Boolean equations shown above may be implemented using any equivalent logic circuits. The choice of logic may be dependent on such factors as the type of transistors used on a given integrated circuit (e.g., complimentary metal oxide semiconductor (CMOS)), the level of the technology (i.e. the size of the gates) or the device library available to the designer, for example.

Accordingly, generate and propagate (G-P) circuit 300 includes a combinatorial logic circuit for creating a generate and propagate bit pair. In the illustrated embodiment, the logic is implemented using two levels of NAND and NOR gates instead of the AND and OR gates as shown in the above equations. Thus, the Boolean equation for G-P circuit 300 may be written as:

$$Gj = \overline{(\overline{A_{i+1} \cdot B_{i+1}}) \cdot (\overline{A_{i+1} \cdot A_i \cdot B_i}) \cdot (\overline{B_{i+1} \cdot A_i \cdot B_i})} \text{ and}$$

$$Pj = \overline{(\overline{A_{i+1} + B_{i+1}}) + (\overline{A_i + B_i})}.$$

In the illustrated embodiment, G-P circuit 300 provides a generate and propagate bit pair (e.g., $G_j$ and $P_j$) in response to receiving bits $A_i$ and $A_{i+1}$ and $B_i$ and $B_{i+1}$ which correspond to two respective columns.

Figure 3B:
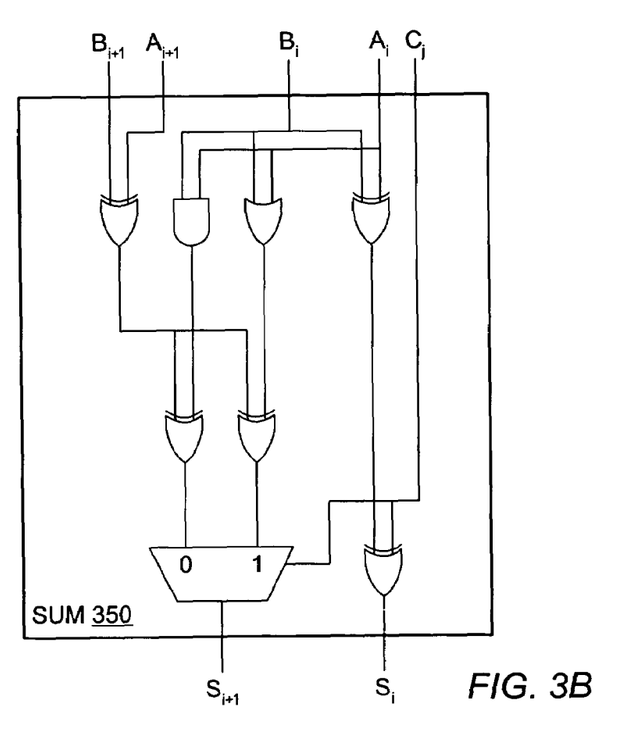
FIG. 3B is a diagram of one embodiment of a summing circuit of FIG. 2.

Turning to FIG. 3B, a diagram of one embodiment of a summing circuit of FIG. 2 is shown. General Boolean equations for creating two sum bits (e.g., $S_i$ and $S_{i+1}$) from two columns of bits is shown below. The equation for $S_i$ is the same as for one column and may be written as:

$$S_i = (A_i \oplus B_i) \oplus C_j.$$

However, since the carry-in bit Cj may either be a logic value of one or zero, the general equations for $S_{i+1}$ may be written for each case as:

For $C_j = 0$, then $S_{i+1} = (A_{i+1} \oplus B_{i+1}) \oplus (A_i \cdot B_i)$ and For $C_j = 1$, then $S_{i+1} = (A_{i+1} \oplus B_{i+1}) \oplus (A_i + B_i)$.

In the illustrated embodiment, sum circuit 350 includes a combinatorial logic circuit for creating two sum bits $S_i$ and $S_{i+1}$. The logic is implemented using $C_j$ as a selector for a multiplexer that selects which from of $S_{i+1}$ is output. Thus, sum circuit 350 may be configured to generate the sum bits in response to receiving $A_i$ and $A_{i+1}$ and $B_i$ and $B_{i+1}$ which correspond to two respective columns and a carry bit. As illustrated in FIG. 2, a subset of the summation units (e.g., sum2–3 through sum10–11) may receive carry-in bits ($C_1$–$C_5$) created by carry creation unit 100 and another subset of the summation units (e.g., sum0–1) receives another carry-in bit (e.g., $C_0$).

Although the generate and propagate bits are shown in FIG. 1 as one level of logic using AND and OR gates, many logic circuits today are implemented using NAND and NOR gates. Thus, generate and propagate logic circuits of FIG. 1, which are represented by $G_i = A_i B_i$ and $P_i = A_i + B_i$ may be equivalent to NAND/NOR circuits represented by $G_i = \overline{(\overline{A_i B_i})}$ and $P_i = \overline{(\overline{A_i + B_i})}$, which are tw addition of the inverters.

From a practical standpoint, there may be some tradeoffs when implementing one logic circuit over another logic circuit. For example, the logic circuit implementations illustrated in FIG. 3A and FIG. 3B use three-input gates and thus may be slightly slower than the NAND/NOR circuits that are equivalent to the logic circuits illustrated in the embodiment of FIG. 1 due to the larger fan-in on the three-input gates as compared to the fan-in on the two-input gates. Therefore, it is conceivable that creating a generate and propagate bit pair from two columns may be slightly slower than creating a generate and propagate bit pair from one column. Similarly, when creating sum bits, there may be an additional delay due to fan out of the carry-in bits to more than one place. However, the logic circuit implementations illustrated in FIG. 3A and FIG. 3B still only use two levels of gates. Accordingly, the critical timing paths through those gates may be comparable in magnitude to the critical timing paths through the NAND/NOR circuits that are equivalent to the logic circuits illustrated in the embodiment of FIG. 1. However, in addition to a non-linear increase in the number gates in a larger carry creation unit, dependent upon the number if bits to be added, there may also be an increase in the number of levels of logic within the larger carry creation unit. This increase in logic levels of a larger carry creation unit may increase the critical timing paths for creating the respective carry-in bits. Thus, the savings in overall die area, critical timing path delays and wire delays which would be incurred due to using a larger carry creation unit may overshadow the slight increase in propagation times of the signals through the logic implementations of G-P circuit 300 of FIG. 3A and sum unit 350 of FIG. 3B. Thus, the 12-bit addition illustrated in FIG. 2 may be carried out almost as fast as the six bit addition shown in FIG. 1, but using a smaller carry creation unit than would otherwise have been used in a conventional 12-bit carry look-ahead adder.

Figure 4:
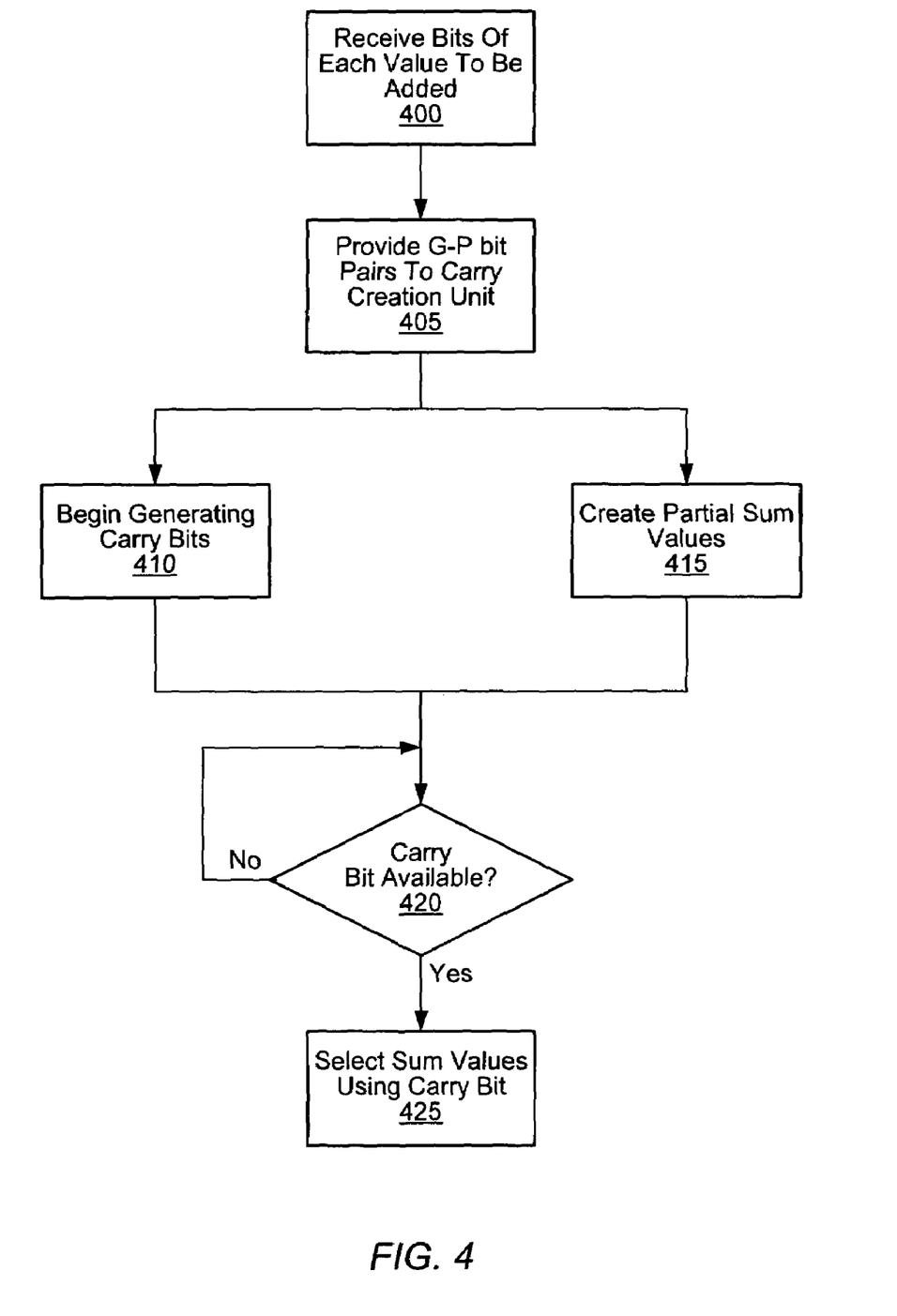
FIG. 4 is a flow diagram describing one embodiment of an algorithm for combining multiple columns.

FIG. 4 illustrates a flow diagram describing the operation of one embodiment of an adder that combines multiple columns when creating generate and propagate bits. Referring collectively to FIG. 2 through FIG. 4, the operation of carry look-ahead adder 20 is described. Beginning in block 400, each of the combiner units receives respective bits corresponding to two columns of the two values to be added. Using combinatorial logic, each combiner unit may provide a generate and propagate bit pair to carry creation unit 100 in response to receiving the respective bits of the two values (block 405). Carry creation unit may begin generating carry bits (e.g., $C_1$–$C_6$) (block 410). During the time that the generate and propagate bit pairs are propagating through carry creation unit 100, using combinatorial logic, each of the summation units Sum 0–1 through Sum10–11 may create partial sums by allowing the respective bits corresponding to the two columns of the two values to be added to propagate through the logic (block 415). If the carry bits are not available from carry creation unit 100, the summation units wait to receive the carry bits (block 420). It is noted that the carry creation time is typically the longest delay for the adder. As shown in FIG. 3B, when the carry bits are available, each carry bit created by carry creation unit 100 may be used by most of the summation units to select one or more outputs for $S_{i+1}$, (block 425). The only exceptions are the $C_o$ carry bit, which is provided as a carry-in bit to the addition and used by sum0–1 and the $C_6$ carry bit, which is not used to select an output in the illustrated embodiment but is instead itself a sum bit (e.g., $S_{12}$). Once all sum bits have been output, the addition is complete.

Figure 5:
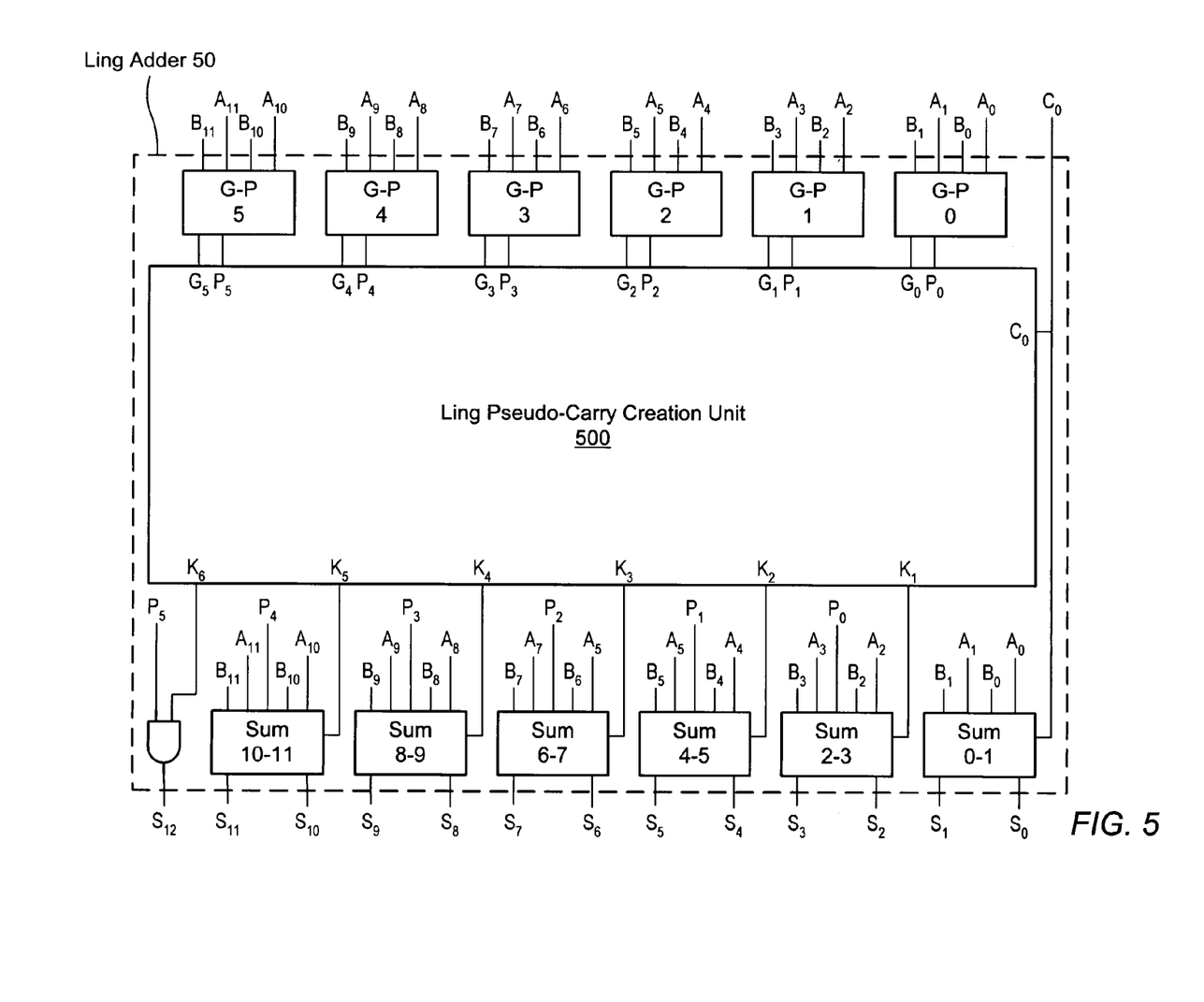
FIG. 5 is a block diagram of one embodiment of a Ling adder that combines two columns.

Turning to FIG. 5, a block diagram of one embodiment of a Ling adder that combines two generate and propagate bits per column is shown. Ling adder 50 includes a ling pseudo-carry creation unit 500 coupled to a plurality of combiner units that are designated G-P0 through G-P5. In addition, Ling adder 50 includes a plurality of summation units designated Sum0–1 through Sum11–12.

Figure 6:
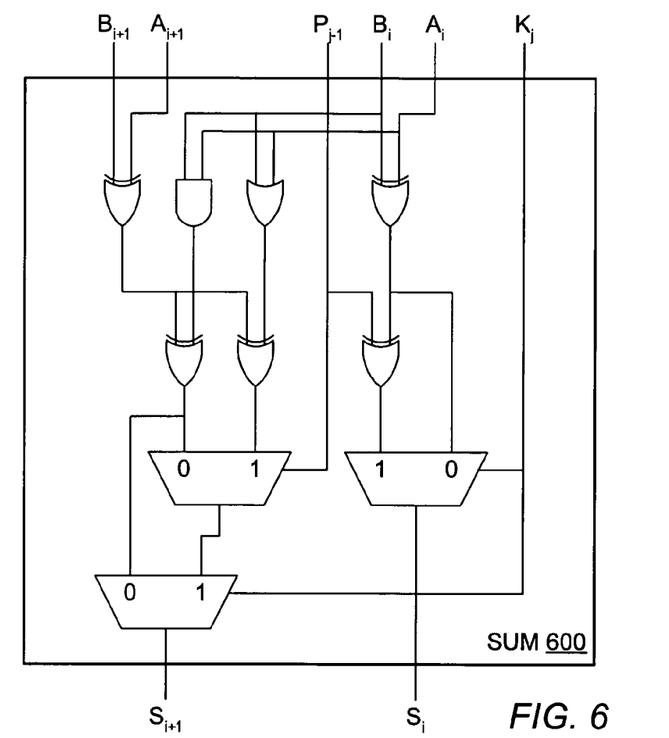
FIG. 6 is a diagram of one embodiment of a summing circuit of FIG. 5.

Generally speaking, Ling adders don't create carry in bits (e.g., $C_{1-6}$); instead Ling adders create pseudo-carry-in bits, designated $K_1$–$K_6$ in FIG. 6. The true carry-in bit, $C_i$, for a given column may be obtained from the pseudo-carry in bit, $K_i$, by performing an AND operation on it with the previous propagate bit, $P_{i-1}$. For example, $C_i = K_i \cdot P_{i-1}$; However, this is not usually done. As illustrated in that portion of the circuit of FIG. 6 that produces the output $S_i$, $P_{j-1}$ is usually combined with the inputs $A_i$ and $B_i$ to form the two possible values for the sum bit, $S_i$, while pseudo-carry creation unit 500 is functioning. Once the pseudo-carry-in bits are available, they may be used to select which bit becomes the sum bit $S_i$.

In one embodiment, combiner units G-P0 through G-P5 of FIG. 5 are the same as the combiner units illustrated in FIG. 2-FIG. 3B. Thus, combiner units G-P0 through G-P5 of FIG. 5 may also be configured to create each of the generate and propagate bit pairs based upon two columns of input values. Similarly, the summation units illustrated in FIG. 5 may also be configured to create the sum bits based upon two columns of input values. However as will be described in greater detail below in conjunction with the description of FIG. 6, most of the sum bits of FIG. 5 are created differently.

Referring to FIG. 6, a diagram of one embodiment of a summing circuit of FIG. 5 is shown. General Boolean equations for creating two sum bits (e.g., $S_i$ and $S_{i+1}$) from two columns of bits is shown below. Since the pseudo-carry-in bit $K_j$ may either be a logic value of one or zero, the general equations for $S_i$ and $S_{i+1}$ may be written for each case as:

For $K_j=0$, then $S_i=A_i \oplus B_i$ and $S_{i+1}=(A_{i+1} \oplus B_{i+1}) \oplus (A_i \cdot B_i)$ and for $K_j=1$ then $S_i=(A_i \oplus B_i) \oplus P_{j-1}$ and for $K_j=1$ and $P_{j-1}=0$, then $S_{i+1}=(A_{i+1} \oplus B_{i+1}) \oplus (A_i \cdot B_i)$ and for $K_j=1$ and $P_{j-1}=1$, $S_{i+1}=(A_{i+1} \oplus B_{i+1}) \oplus (A_i+B_i)$.

In the illustrated embodiment, sum circuit 600 includes a combinatorial logic circuit for creating two sum bits $S_i$ and $S_{i+1}$. The logic is implemented using pseudo-carry-in bit $K_j$ as a selector for two multiplexers that select which form of $S_i$ and $S_{i+1}$ is output. In addition, $P_{j-1}$ is used as a selector for one multiplexer. Thus, sum circuit 600 is configured to generate the sum bits in response to receiving $A_i$ and $A_{i+1}$ and $B_i$ and $B_{i+1}$ which correspond to two respective columns and a pseudo-carry-in bit. As illustrated in FIG. 5, a subset of the summation units (e.g., sum2–3 through sum10–11) may receive pseudo-carry-in bits ($K_1$–$K_5$) created by pseudo-carry creation unit 500 and another subset of the summation units (e.g., sum0–1) receives a true carry-in bit (e.g., $C_0$). It is noted that in one embodiment, the time from the arrival of $K_j$ to the output of $S_i$ and $S_{i+1}$ in FIG. 6 is substantially the same as the time from the arrival of $C_i$ to the output of $S_i$ and $S_{i+1}$ in FIG. 3B.

Similar to the carry look-ahead adder described above, the Ling adder of FIG. 5 may be used to perform an addition on 12-bit values while using the same pseudo-carry creation unit as may be used to perform a six-bit addition. Thus, the 12-bit addition illustrated in FIG. 5 may be carried out almost as fast as a six-bit addition, but using the smaller carry creation unit than would otherwise have been used in a conventional Ling adder.

In certain cases, one of the two values to be added together may only contain a bit in every other position. For example, if every other bit position of a given value is known to always be a zero, it may not make sense to wire those bits to the adder. This scenario may be the result of certain addition steps in a multiplication algorithm. Below is an example of two values (A and B) to be added and one of the values, B, only has bits in every other position because the even bit positions are known to be zero. Adding two numbers such as A and B below may sometimes be referred to as sparse addition.

The grouping of columns together may be simplified in the case of sparse addition. For example, the grouping of columns in pairs using sparse addition may result in a simpler, smaller and faster circuit than grouping columns in pairs for non-sparse addition, as was described above in conjunction with the description of FIG. 2 through FIG. 3B. Thus, when the even positions of the 'B' value are known to be zero, the Boolean expression for the generate and propagate bits simply becomes $Gj=A_{i+1} \cdot B_{i+1}$, and $Pj=(A_{i+1}+B_{i+1}) \cdot A_i$. Further, the Boolean expression for $S_i$ becomes $S_i=A_i \oplus C_j$ and the Boolean expression for $S_{i+1}$ becomes for $C_j=0$, $S_{i+1}=A_{i+1} \oplus B_{i+1}$ and for $C_j=1$, $S_{i+1}=(A_{i+1} \oplus B_{i+1}) \oplus Ai$. These expressions provide for simpler circuits than the circuits illustrated in FIG. 3A and FIG. 3B.

In the example shown above, the boxes surrounding $A_0$–$A_3$, $B_1$ and $B_3$, $A_4$–$A_7$, $B_5$ and $B_7$ and $A_8$–$A_{11}$, $B_9$ and $B_{11}$ represent the groupings of bits that may be combined in each combiner unit to create generate and propagate bit pairs to perform sparse addition grouping of columns in four-bit groups.

Using the idea that the grouping of more than one column per generate and propagate bit pair may allow for addition of values having a greater number of bits while using same carry creation unit, multiple columns of bits may be combined to create both generate and propagate bit pairs as well as sum bits. Accordingly, as will be described below in conjunction with the description of FIG. 7 and FIG. 8, when every other bit position is known to be zero, the Boolean expressions for producing both generate and propagate bit pairs as well as sum bits may be simplified, thereby allowing for a simpler circuit than may have otherwise been possible.

Figure 7:
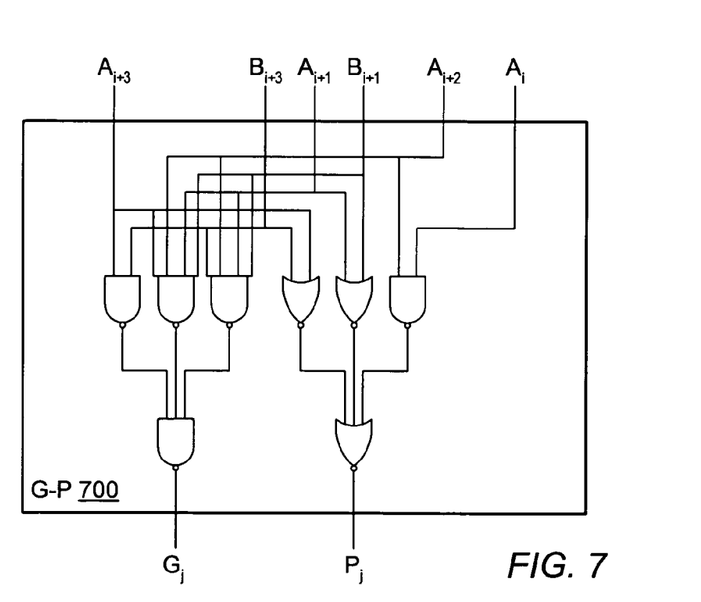
FIG. 7 is a diagram of one embodiment of a generate and propagate bit circuit of a carry look-ahead adder that combines four columns.

Turning to FIG. 7, a diagram of one embodiment of a generate and propagate bit circuit of a carry look-ahead adder that combines four columns is shown. It is noted that G-P circuit 700 is representative of a combiner unit that may be used in conjunction with carry creation block 100 of FIG. 2 as described above to create an adder that may handle more bits (e.g., 24 bits) or to create a 12-bit adder, for example, that uses a smaller carry creation unit.

A general Boolean equation for creating a generate bit $G_j$ from four columns of bits may be written as:

$$Gj=(A_{i+3} \cdot B_{i+3})+(A_{i+3} \cdot A_{i+2} \cdot A_{i+1} \cdot B_{i+1})+(B_{i+3} \cdot A_{i+2} \cdot A_{i+1} \cdot B_{i+1}).$$

Further, a general Boolean equation for creating a propagate bit $P_j$ from two columns of bits may be written as:

$$Pj=(A_{i+3}+B_{i+3}) \cdot (A_{i+1}+B_{i+1}) \cdot (A_{i+2} \cdot A_i).$$

It is noted that the general Boolean equations shown above may be implemented using any equivalent logic circuits. The choice of logic may be dependent on such factors as the type of transistors used on a given integrated circuit (e.g., complimentary metal oxide semiconductor (CMOS)), the level of the technology (i.e. the size of the gates) or the device library available to the designer, for example.

Accordingly, generate and propagate (G-P) circuit 700 includes a combinatorial logic circuit for creating a generate and propagate bit pair. In the illustrated embodiment, the logic is implemented using two levels of NAND and NOR gates instead of the AND and OR gates as shown in the above equations to create an equivalent logic circuit.

In the illustrated embodiment, G-P circuit 700 may provide a generate and propagate bit pair (e.g., $G_j$ and $P_j$) in response to receiving bits $A_i$, $A_{i+1}$, $A_{i+2}$, $A_{i+3}$ and $B_{i+1}$ and $B_{i+3}$ which correspond to four respective columns.

Figure 8:
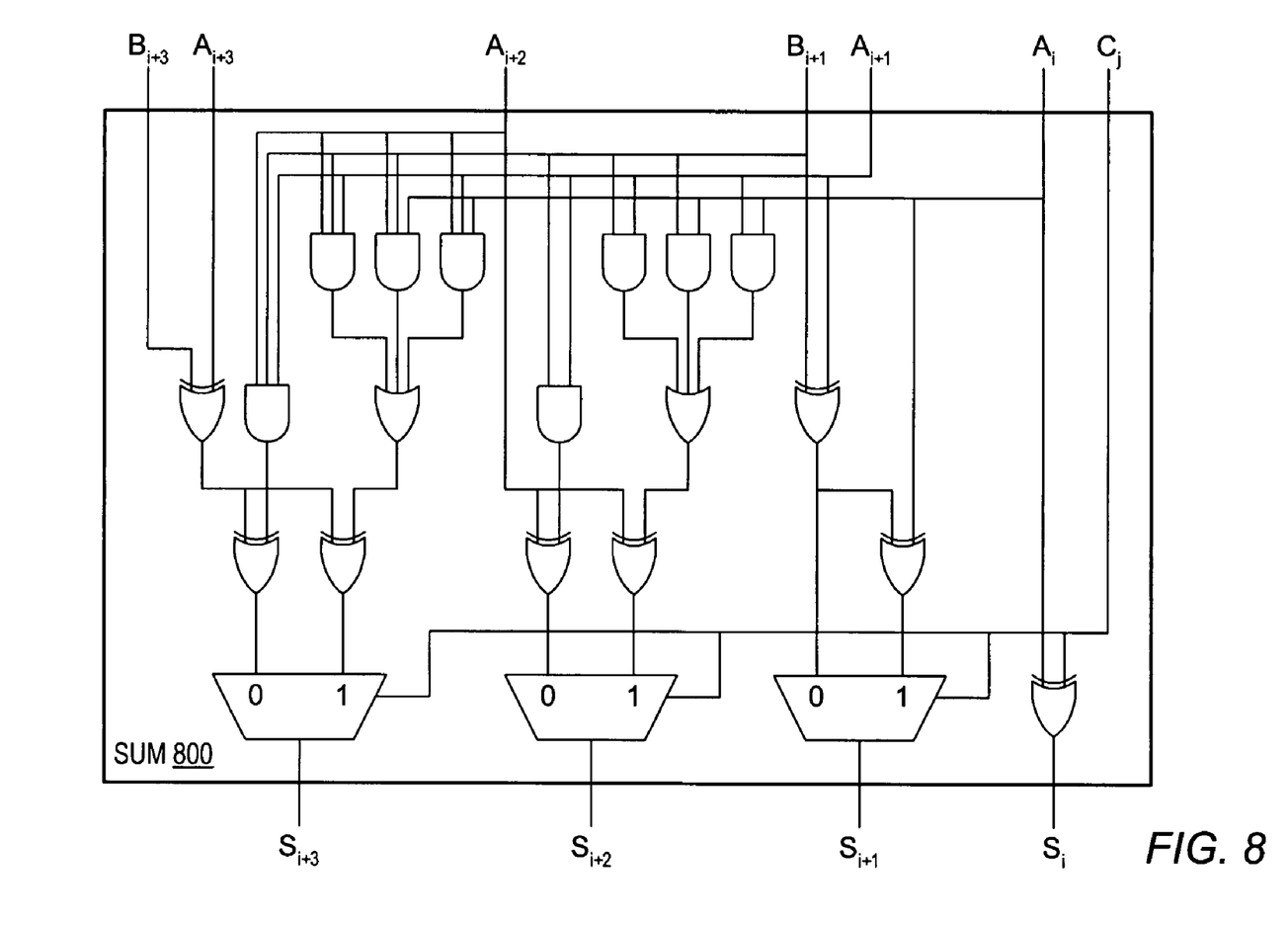
FIG. 8 is a diagram of one embodiment of a summing circuit of a carry look-ahead adder that combines four columns.

Referring to FIG. 8, a diagram of one embodiment of a summing circuit of a carry look-ahead adder that combines four columns is shown. Sum circuit 800 is representative of a sum circuit that may be used in conjunction with carry creation unit 100 of FIG. 2 as described above. In such an embodiment, a 24 bit adder (not shown) could be constructed. Likewise, a carry creation unit that had been designed to add 16 bits, for example, may now be used to perform a sparse addition of 64 bits, thereby possibly providing both a savings in time and die area.

General Boolean equations for creating four sum bits (e.g., $S_i$, $S_{i+1}$, $S_{i+2}$ and $S_{i+3}$) from four columns of bits is shown below. The equation for $S_i$ is the same as for one column and, since $B_i$=0, may be written as:

$$S_i=A_i \oplus C_j.$$

However, since the carry-in bit $C_j$ may either be a logic value of one or zero, the general equations for $S_{i+1}$, $S_{i+2}$ and $S_{i+3}$ may be written for each case as:

For $C_j$=0, then $S_{i+1}=A_i \oplus B_{i+1}$, $S_{i+2}=(A_{i+1} \cdot B_{i+1}) \oplus A_{i+2}$ and $$S_{i+3}=(A_{i+3} \oplus B_{i+3}) \oplus (A_{i+1} \cdot B_{i+1} \cdot A_{i+2}) \text{ and}$$

For $C_j$=1, then $S_{i+1}=(A_{i+1} \oplus B_{i+1}) \oplus Ai$, $$S_{i+2}=((A_{i+1} \cdot B_{i+1})+(A_i \cdot B_{i+1})+(A_i \cdot A_{i+1})) \oplus A_{i+2} \text{ and}$$

$$S_{i+3}=((A_{i+1} \cdot B_{i+1} \cdot A_{i+2})+(Ai \cdot B_{i+1} \cdot A_{i+2})+(A_i \cdot A_{i+1} \cdot A_{i+2})) \oplus (A_{i+3} \oplus B_{i+3}).$$

In the illustrated embodiment, sum circuit 800 includes a combinatorial logic circuit for creating four sum bits $S_i$, $S_{i+1}$, $S_{i+2}$ and $S_{i+3}$. The logic is implemented using $C_j$ as a selector for three multiplexers that select which form of $S_{i+1}$, $S_{+2}$ and $S_{+3}$ is output. Thus, sum circuit 800 may be configured to generate the sum bits in response to receiving $A_i$, $A_{i+1}$, $A_{i+2}$, $A_{i+3}$ and $B_{i+1}$ and $B_{i+3}$ which correspond to four respective columns and a carry bit, Cj. It is noted that in one embodiment, the time from the arrival of $C_i$ to the output of $S_i$, $S_{i+1}$, $S_{i+2}$ and $S_{i+3}$ in FIG. 8 is almost as fast as the time from the arrival of $C_i$ to the output of $S_i$ and $S_{i+1}$ in FIG. 3B. However in FIG. 3B, $C_i$ fans out to only two places while in FIG. 8, $C_i$ fans out to four places. It is further noted that the general Boolean equations shown above may be implemented using any equivalent logic circuits.

Figure 9:
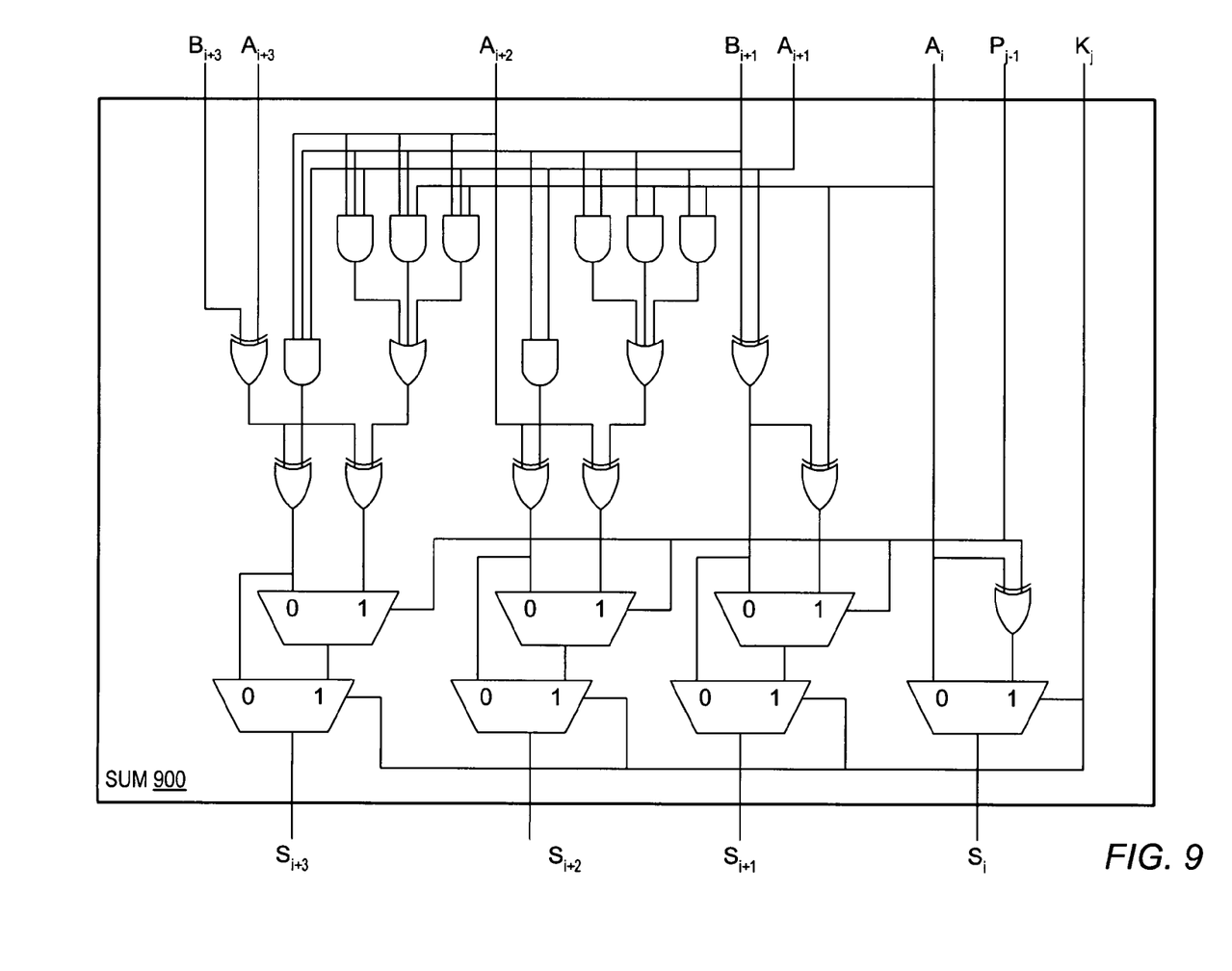
FIG. 9 is a diagram of one embodiment of a summing circuit of a Ling adder that combines four columns.

Turning to FIG. 9, a diagram of one embodiment of a summing circuit of a Ling adder that combines four columns is shown. Sum circuit 900 is representative of a sum circuit that may be used in conjunction with pseudo-carry creation unit 500 of FIG. 5 as described above. Similar to the description of FIG. 8, a 24-bit adder (not shown) could be constructed using sum circuit 900. Likewise, a pseudo-carry creation unit that had been designed to add 16 bits, for example, may now be used to add 64 bits.

General Boolean equations for creating four sum bits (e.g., $S_i$, $S_{i+1}$, $S_{i+2}$ and $S_{i+3}$) from four columns of bits is shown below. Since the carry-in bit Kj may either be a logic value of one or zero, the general equations for $S_i$, $S_{i+1}$, $S_{i+2}$ and $S_{i+3}$ may be written for each case as:

For $K_j=0$, then $S_i=A_i$, $S_{i+1}=A_{i+1}\oplus B_{i+1}$, $S_{i+2}=A_{i+2}\oplus(A_{i+1}B_{i+1})$ and $S_{i+3}=(A_{i+1}\oplus B_{i+3})\oplus(A_{i+1}\cdot A_{i+2}\cdot B_{i+1})$ For $K_j=1$ then $S_i=A_i\oplus P_{j-1}$ and for $K_j=1$ and $P_{j-1}=1$, $S_{i+1}=A_i\oplus(A_i\oplus B_i)$, $S_{i+2}=A_{i+2}\oplus((A_i\cdot A_{i+1})+(A_i\cdot B_{i+1})+(A_{i+1}\cdot B_{i+1}))$ and $S_{i+3}=(A_{i+3}\oplus B_{i+3})\oplus((A_i\cdot A_{i+1}\cdot A_{i+2})+(A_i\cdot A_{i+2}\cdot B_{i+1})+(A_{i+1}\cdot A_{i+2}\cdot B_{i+1}))$.

In the illustrated embodiment, sum circuit 900 includes a combinatorial logic circuit for creating four sum bits $S_i$, $S_{i+1}$, $S_{i+2}$ and $S_{i+3}$. The logic is implemented using pseudo-carry-in bit $K_j$ as a selector for the four output multiplexers that select which form of $S_i$, $S_{i+1}$, $S_{i+2}$ and $S_{i+3}$ is output. In addition, $P_{j-1}$ is used as a selector for three multiplexers. Thus, sum circuit 600 may be configured to generate the sum bits in response to receiving $A_i$, $A_{i+1}$, $A_{i+2}$, $A_{i+3}$ and $B_{i+1}$ and $B_{i+3}$ which correspond to four respective columns and a pseudo-carry-in bit. It is noted that the general Boolean equations shown above may be implemented using any equivalent logic circuits.

It is further noted that although in the embodiments described above two columns and four columns were combined, it is contemplated that in other embodiments other numbers of columns may be combined. For example, a person skilled in the art would be able to interpolate the example illustrating the combining of four columns into an embodiment combining only three columns.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for adding a first value 'A' and a second value 'B', each including a plurality of bits, wherein bits in corresponding bit positions of said first value and said second value form respective columns, said apparatus comprising:

a plurality of combiner units each configured to provide a generate and propagate bit pair in response to receiving respective bits of said first value and said second value which correspond to a plurality of said respective columns;

a carry creation unit coupled to said plurality of combiner units and configured to create an ordered plurality of carry bits each corresponding to one or more of said generate and propagate bit pairs; and a plurality of summation units each configured to generate a plurality of sum bits in response to receiving said respective bits of said first value and said second value which correspond to said plurality of said respective columns, wherein a subset of said plurality of summation units is configured to generate a portion of said plurality of sum bits in response to receiving respective ones of said ordered plurality of carry bits;

wherein each of said plurality of combiner units is configured to create a generate bit $G_j$ and a propagate bit $P_j$ using a combinatorial logic circuit to implement a logic function substantially equivalent to $Gj=(A_{i+1}\cdot B_{i+1})+(A_{i+1}\cdot A_i\cdot B_i)+(B_{i+1}\cdot A_i\cdot B_i)$ and $Pj=(A_{i+1}+B_{i+1})\cdot(A_i+B_i)$.

2. The apparatus as recited in claim 1, wherein another subset of said plurality of summation units is configured to generate another portion of said plurality of sum bits in response to receiving a different carry bit.

3. The apparatus as recited in claim 1, wherein each generate and propagate bit pair occupies an ordered position from a least significant ordered position to a most significant ordered position.

4. The apparatus as recited in claim 3, wherein each of said ordered plurality of carry bits occupies an ordered position from a least significant ordered position to a most significant ordered position.

5. The apparatus as recited in claim 4, wherein each of said ordered plurality of carry bits is based upon all generate and propagate bit pairs occupying less significant ordered positions.

6. The apparatus as recited in claim 3, wherein said ordered plurality of carry bits are pseudo-carry bits.

7. The apparatus as recited in claim 6, wherein each of said subset of said plurality of summation units is configured to generate said plurality of sum bits in response to receiving a propagate bit and a corresponding one of said pseudo-carry bits.

8. An apparatus for adding a first value 'A' and a second value 'B', each including a plurality of bits, wherein bits in corresponding bit positions of said first value and said second value form respective columns, said apparatus comprising:

a plurality of combiner units each configured to provide a generate and propagate bit pair in response to receiving respective bits of said first value and said second value which correspond to a plurality of said respective columns;

a carry creation unit coupled to said plurality of combiner units and configured to create an ordered plurality of carry bits each corresponding to one or more of said generate and propagate bit pairs; and a plurality of summation units each configured to generate a plurality of sum bits in response to receiving said respective bits of said first value and said second value which correspond to said plurality of said respective columns, wherein a subset of said plurality of summation units is configured to generate a portion of said plurality of sum bits in response to receiving respective ones of said ordered plurality of carry bits;

wherein each of said plurality of summation units is configured to create a sum bit $S_i$ and a sum bit $S_{i+1}$ using a combinatorial logic circuit to implement a logic function substantially equivalent to $S_i=(A_i \oplus B_i) \oplus C_j$ and for $C_j=0$, then $S_{i+1}=(A_{i+1} \oplus B_{i+1}) \oplus (A_i \cdot B_i)$ and for $C_j=1$, then $S_{i+1}=(A_{i+1} \oplus B_{i+1}) \oplus (A_i+B_i)$.

9. The apparatus as recited in claim 8, wherein another subset of said plurality of summation units is configured to generate another portion of said plurality of sum bits in response to receiving a different carry bit.

10. The apparatus as recited in claim 8, wherein each generate and propagate bit pair occupies an ordered position from a least significant ordered position to a most significant ordered position.

11. The apparatus as recited in claim 10, wherein each of said ordered plurality of carry bits occupies an ordered position from a least significant ordered position to a most significant ordered position.

12. The apparatus as recited in claim 11, wherein each of said ordered plurality of carry bits is based upon all generate and propagate bit pairs occupying less significant ordered positions.

13. An apparatus for adding a first value 'A' and a second value 'B', each including a plurality of bits, wherein bits in corresponding bit positions of said first value and said second value form respective columns, said apparatus comprising:

a plurality of combiner units each configured to provide a generate and propagate bit pair in response to receiving respective bits of said first value and said second value which correspond to a plurality of said respective columns;

a carry creation unit coupled to said plurality of combiner units and configured to create an ordered plurality of carry bits each corresponding to one or more of said generate and propagate bit pairs; and a plurality of summation units each configured to generate a plurality of sum bits in response to receiving said respective bits of said first value and said second value which correspond to said plurality of said respective columns, wherein a subset of said plurality of summation units is configured to generate a portion of said plurality of sum bits in response to receiving respective ones of said ordered plurality of carry bits; wherein each of said plurality of combiner units is configured to create a generate bit $G_j$ and a propagate bit $P_j$ using a combinatorial logic circuit to implement a logic function substantially equivalent to $Gj=(A_{i+3} \cdot B_{i+3})+(A_{i+3} \cdot A_{i+2} \cdot A_{i+1} \cdot B_{i+1})+(B_{i+3} \cdot A_{i+2} \cdot A_{i+1} \cdot B_{i+1})$ and $Pj=(A_{i+3}+B_{i+3}) \cdot (A_{i+1}+B_{i+1}) \cdot (A_{i+2} \cdot A_i)$, and wherein every other bit position of said second value is equal to zero.

14. The apparatus as recited in claim 13, wherein another subset of said plurality of summation units is configured to generate another portion of said plurality of sum bits in response to receiving a different carry bit.

15. The apparatus as recited in claim 13, wherein each generate and propagate bit pair occupies an ordered position from a least significant ordered position to a most significant ordered position.

16. The apparatus as recited in claim 15, wherein each of said ordered plurality of carry bits occupies an ordered position from a least significant ordered position to a most significant ordered position.

17. The apparatus as recited in claim 16, wherein each of said ordered plurality of carry bits is based upon all generate and propagate bit pairs occupying less significant ordered positions.

18. An apparatus for adding a first value 'A' and a second value 'B', each including a plurality of bits, wherein bits in corresponding bit positions of said first value and said second value form respective columns, said apparatus comprising:

a plurality of combiner units each configured to provide a generate and propagate bit pair in response to receiving respective bits of said first value and said second value which correspond to a plurality of said respective columns;

a carry creation unit coupled to said plurality of combiner units and configured to create an ordered plurality of carry bits each corresponding to one or more of said generate and propagate bit pairs; and a plurality of summation units each configured to generate a plurality of sum bits in response to receiving said respective bits of said first value and said second value which correspond to said plurality of said respective columns, wherein a subset of said plurality of summation units is configured to generate a portion of said plurality of sum bits in response to receiving respective ones of said ordered plurality of carry bits;

wherein each of said plurality of summation units is configured to create sum bits $S_i$, $S_{i+1}$, $S_{i+2}$ and $S_{i+3}$ using a combinatorial logic circuit to implement a logic function substantially equivalent to $S_i=A_i \oplus C_j$ and for $C_j=0$, then $S_{i+1}=A_i \oplus B_{i+1}$, $S_{i+2}=(A_{i+1} \cdot B_{i+1}) \oplus A_{i+2}$ and $S_{i+3}=(A_{i} \oplus B_{i+3}) \oplus (A_{i+1} \cdot B_{i+1} \cdot A_{i+2})$ and for $C_j=1$, then $S_{i+1}=(A_{i+1} \oplus B_{i+1}) \oplus A_i$, $S_{i+2}=((A_{i+1} \cdot B_{i+1})+(A_i \cdot B_{i+1})+(A_i \cdot A_{i+1})) \oplus A_{i+2}$ and $S_{i+3}=((A_{i+1} \cdot B_{i+1} \cdot A_{i+2})+(A_i \cdot B_{i+1} \cdot A_{i+2})+(A_i \cdot A_{i+1} \cdot A_{i+2})) \oplus (A_{i+3} \oplus B_{i+3})$ and wherein every other bit position of said second value is equal to zero.

* * * * *